United States Patent
Yokohara

(10) Patent No.: US 7,588,384 B2
(45) Date of Patent: Sep. 15, 2009

(54) BALL JOINT AND BEARING SEAT THEREOF

(75) Inventor: Toyoaki Yokohara, Hamamatsu (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 44 days.

(21) Appl. No.: 10/596,245

(22) PCT Filed: Nov. 16, 2004

(86) PCT No.: PCT/JP2004/016980

§ 371 (c)(1), (2), (4) Date: Jun. 6, 2006

(87) PCT Pub. No.: WO2005/064172

PCT Pub. Date: Jul. 14, 2005

(65) Prior Publication Data

US 2007/0140784 A1    Jun. 21, 2007

(30) Foreign Application Priority Data

Dec. 25, 2003  (JP) ............................... 2003-431213

(51) Int. Cl.
*F16C 11/06*    (2006.01)

(52) U.S. Cl. ................ 403/135; 403/133; 384/284; 384/285; 184/5

(58) Field of Classification Search ............ 403/133, 403/135, 124; 473/384; 384/284, 285; 184/5, 184/5.1, 6

See application file for complete search history.

(56) References Cited

U.S. PATENT DOCUMENTS

| | | | | |
|---|---|---|---|---|
| 3,647,249 A | * | 3/1972 | Baba et al. ............ | 403/126 |
| 3,945,739 A | * | 3/1976 | Abe ...................... | 403/138 |
| 4,105,267 A | * | 8/1978 | Mori | |
| 4,904,106 A | * | 2/1990 | Love .................... | 403/135 |
| 5,247,873 A | * | 9/1993 | Owens et al. ......... | 403/135 |
| 5,282,396 A | * | 2/1994 | Crandall .............. | 403/133 |
| 5,795,092 A | * | 8/1998 | Jaworski et al. ..... | 403/133 |
| 5,916,044 A | * | 6/1999 | Shimosaka et al. .. | 473/384 |
| 5,916,269 A | * | 6/1999 | Serbousek et al. | |
| 5,935,023 A | * | 8/1999 | Maehara et al. ..... | 473/384 |
| 6,042,293 A | * | 3/2000 | Maughan ............. | 403/135 |

(Continued)

FOREIGN PATENT DOCUMENTS

DE            4419954 A1 *  1/1996

(Continued)

OTHER PUBLICATIONS

Patent Abstracts of Japan for JP2000-230540 published Aug. 22, 2000.

*Primary Examiner*—Daniel P Stodola
*Assistant Examiner*—Ernesto Garcia
(74) *Attorney, Agent, or Firm*—Darby & Darby P.C.

(57)  ABSTRACT

A bearing seat of a ball joint improved in lubricity is provided. By opening a plurality of dimples that are opened on a spherical sliding surface that rotatably holds an approximately globular ball portion of a ball stud and house a grease, the dimples can be provided in a balanced manner in proximity to each other, therefore, the grease spreads out between the respective dimples even when sway of the ball portion is relatively small, and lubricity can be improved.

4 Claims, 3 Drawing Sheets

U.S. PATENT DOCUMENTS

| | | | |
|---|---|---|---|
| 6,095,690 A * | 8/2000 | Niegel et al. | |
| 6,231,264 B1 * | 5/2001 | McLaughlin et al. | 403/135 |
| 6,505,989 B1 * | 1/2003 | Pazdirek et al. | 403/135 |
| 6,702,502 B1 * | 3/2004 | Graber et al. | 403/133 |
| 6,866,685 B2 * | 3/2005 | Chan et al. | |
| 7,399,122 B2 * | 7/2008 | Fujita et al. | 384/284 |
| 2003/0152420 A1 * | 8/2003 | Broker | 403/135 |

FOREIGN PATENT DOCUMENTS

| | | | |
|---|---|---|---|
| GB | 847171 | * | 9/1960 |
| GB | 2229765 A | * | 10/1990 |
| JP | 48-72551 A | | 9/1973 |
| JP | 53-24626 | * | 6/1978 |
| JP | 2000-230540 A | | 8/2000 |
| JP | 2003-507665 A | | 2/2003 |
| JP | 2004011782 A | * | 1/2004 |
| JP | 2004169820 A | * | 6/2004 |
| KR | 2001107452 A | * | 12/2001 |

\* cited by examiner

BALL JOINT AND BEARING SEAT THEREOF

CROSS-REFERENCE TO PRIOR APPLICATION

This application is a U.S. national phase application under 35 U.S.C. §371 of International Application No. PCT/JP2004/016980, filed Nov. 16, 2004, and claims the benefit of Japanese Application No. 2003-431213 filed Dec. 25, 2003. The International Application was published in Japanese on Jul. 14, 2005 as International Publication No. WO 2005/064172 under PCT Article 21(2).

TECHNICAL FIELD

The present invention relates to a bearing seat retaining a lubricant between the same and the outer circumferential surface of a ball portion and a ball joint provided with the same.

BACKGROUND ART

Conventionally, for example, ball joints used in suspension devices or steering devices of automobiles have been each constructed by slidably attaching a ball stud provided with an approximately globular ball portion to a synthetic resin-made ball seat being a bearing seat provided in a socket. The ball seat has had an approximately spherical sliding surface along the outer circumferential surface of the ball portion. In addition, a grease being a lubricant has been filled between the outer circumferential surface of the ball portion and sliding surface of the ball seat (See for example Japanese Laid-open Patent Publication No. 2000-230540 (Pages 4-6, FIG. 1)).

SUMMARY OF THE INVENTION

Problem to be Solved by the Invention

However, with the aforementioned ball joint, since the outer circumferential surface of the ball portion and the sliding surface of the ball seat are approximately equal in shape, these contact each other almost uniformly across the entire outer circumferential surface of the ball portion, therefore, the grease does not easily spread out between the outer circumferential surface of the ball portion and sliding surface of the ball seat.

In particular, when the ball joint is used for a double wishbone-type lower suspension or the like, since the ball joint is loaded with a vehicle weight at all times, it is very disadvantageous in lubricity by the grease, wear is accelerated at the ball seat, and the ball portion mainly sways with little rotation, therefore, it becomes further disadvantageous in lubricity.

As a result, demands have been made for a further improvement in lubricity of the ball seat.

The present invention has been made in view of such a problem, and an object is to provide a bearing seat of a ball joint improved in lubricity and a ball joint provided with the same.

A bearing seat of a ball joint according to an aspect of the present invention is a bearing seat of a ball joint provided in a socket with an opening, having a spherical sliding surface that rotatably holds an approximately globular ball portion of a ball stud arranged in this socket and has a latitudinal direction and a longitudinal direction and an opening communicated with the opening portion, that comprises: a plurality of housing concave portions that are respectively opened at alternate positions on the sliding surface in a manner opposed to an outer circumferential surface of the ball portion and house a lubricant.

And, opening the plurality of housing concave portions that are opened on the spherical sliding surface that rotatably holds the approximately globular ball portion of the ball stud and house a lubricant at alternate positions makes it possible to provide the housing concave portions in a balanced manner in proximity to each other, therefore, the lubricant spreads out between the respective housing concave portions even when sway of the ball portion is relatively small, and lubricity is improved.

A bearing seat of a ball joint according to another aspect of the present invention is the bearing seat of a ball joint according to the previous aspect of the present invention, wherein the housing concave portions are respectively opened on the sliding surface so that mutually adjacent ones are different in the latitudinal direction position and longitudinal direction position from each other.

And, respectively opening the respective housing concave portions on the sliding surface so that mutually adjacent ones are different in the latitudinal direction position and longitudinal direction position from each other makes it possible to provide the housing concave portions on the sliding surface in a more balanced manner, therefore, lubricity is further improved.

A bearing seat of a ball joint according to a further aspect of the present invention is the bearing seat of a ball joint according to the previous aspect of the present invention, wherein the housing concave portions form lines along a predetermined direction, and respective opening areas of the mutually adjacent lines are different from each other.

And, making the respective opening areas of the mutually adjacent lines of the housing concave portions that form lines along a predetermined direction different from each other makes it possible to provide the housing concave portions in greater proximity therebetween, therefore, lubricity is further improved.

A bearing seat of a ball joint according to another aspect of the present invention is the bearing seat of a ball joint according to anyone of the above to third aspects, wherein the housing concave portions includes: a plurality of first housing portions that form at least one tier along the latitudinal direction, having opening areas almost equal to each other; and a plurality of second housing portions that are respectively provided so as to form tiers, at one-end side and an equator side in the longitudinal direction of the at least one tier of these first housing portions, respectively, along the latitudinal direction by ones having opening areas equal to each other and so that opening areas sequentially increase from the tier at the one-end side to the tier at the equator side in the longitudinal direction.

And, forming at least one tier along the latitudinal direction by the plurality of first housing portions having opening areas almost equal to each other and providing the second housing portions so as to form tiers, at one-end side and an equator side in the longitudinal direction of the at least one tier of the first housing portions, respectively, along the latitudinal direction by ones having opening areas equal to each other and so that opening areas sequentially increase from the tier at the one-end side to the tier at the equator side in the longitudinal direction makes it possible to use the space on the spherical sliding surface that increases in area from the one-end side to the equator side so as to provide the housing concave portions greater proximity, therefore, lubricity is further improved.

A bearing seat of a ball joint according to an aspect of the present invention is a bearing seat of a ball joint provided in a socket with an opening, having a spherical sliding surface that rotatably holds an approximately globular ball portion of a ball stud arranged in this socket and an opening communicated with the opening portion, that comprises: a plurality of housing concave portions that are respectively opened on the sliding surface in a manner opposed to an outer circumferential surface of the ball portion, are respectively provided so as to form lines along the longitudinal direction and form tiers along the latitudinal direction by ones having opening areas equal to each other and so that opening areas sequentially increase from the tier at one-end side to the tier at an equator side in the longitudinal direction, and house a lubricant.

And, respectively providing, on the spherical sliding surface that rotatably holds the approximately globular ball portion of the ball stud, the housing concave portions that house a lubricant so as to form lines along the longitudinal direction and form tiers along the latitudinal direction by ones having opening areas equal to each other and so that opening areas sequentially increase from the tier at one-end side to the tier at an equator side in the longitudinal direction makes it possible to use the space on the spherical sliding surface that increases in area from the one-end side to the equator side so as to provide the housing concave portions in a balanced manner in proximity to each other, therefore, the lubricant spreads out between the respective housing concave portions even when sway of the ball portion is relatively small, and lubricity is improved.

A bearing seat of a ball joint according to another aspect of the present invention is the bearing seat of a ball joint according to any one of the above aspects of the present invention, wherein the housing concave portions are opened respectively in approximately circular forms.

And, opening the housing concave portions respectively in approximately circular forms makes it also possible to make the distance between the mutually adjacent housing concave portions, therefore, lubricity is further improved.

A ball joint according to a further aspect of the present invention is a ball joint that has: a socket with an opening portion; the bearing seat according to any of the previous aspects of the present invention provided in the socket; and a ball stud with a ball portion rotatably held in this bearing seat and housed in the socket and a stud portion provided in a protruding condition from this ball portion and to be inserted through the opening portion.

And, comprising the bearing seat according to any of the above aspects of the present invention makes it possible to improve lubricity.

Effect of the Invention

According to the bearing seat of a ball joint according to an aspect of the present invention, the housing concave portions can be provided in a balanced manner in proximity to each other by opening the plurality of housing concave portions that are opened on the spherical sliding surface that rotatably holds the approximately globular ball portion of the ball stud and house a lubricant at alternate positions, therefore, the lubricant spreads out between the respective housing concave portions even when sway of the ball portion is relatively small, and lubricity can be improved.

According to the bearing seat of a ball joint according to another aspect of the present invention, in addition to the effect of the bearing seat of a ball joint according to the above aspect of the present invention, the housing concave portions can be provided on the sliding surface in a more balanced manner by respectively opening the respective housing concave portions on the sliding surface so that mutually adjacent ones are different in the latitudinal direction position and longitudinal direction position from each other, therefore, lubricity can further be improved.

According to the bearing seat of a ball joint according to a further aspect of the present invention, in addition to the effect of the bearing seat of a ball joint according to the above aspects of the present invention, the housing concave portions can be provided in greater proximity therebetween by making the respective opening areas of the mutually adjacent lines of the housing concave portions that form lines along a predetermined direction different from each other, therefore, lubricity can further be improved.

According to the bearing seat of a ball joint according to another aspect of the present invention, in addition to the effect of the bearing seat of a ball joint according to the previous aspects of the present invention, the space on the spherical sliding surface that increases in area from the one-end side to the equator side can be used so as to provide the housing concave portions in greater proximity by forming at least one tier along the longitudinal direction by the plurality of first housing portions having opening areas almost equal to each other and providing the second housing portions so as to form tiers, at the one-end side and the equator side in the longitudinal direction of the at least one tier of the first housing portions, respectively, along the latitudinal direction by ones having opening areas equal to each other and so that opening areas sequentially increase from the tier at the one-end side to the tier at the equator side in the longitudinal direction, therefore, lubricity can further be improved.

According to a ball joint according to an aspect of the present invention, the space on the spherical sliding surface that increases in area from the one-end side to the equator side can be used so as to provide the housing concave portions in a balanced manner in proximity to each other by respectively providing, on the sliding surface, the housing concave portions that house a lubricant so as to form lines along the longitudinal direction and form tiers along the latitudinal direction by ones having opening areas equal to each other and so that opening areas sequentially increase from the tier at the one-end side to the tier at the equator side in the longitudinal direction, therefore, the lubricant spreads out between the respective housing concave portions even when sway of the ball portion is relatively small, and lubricity can be improved.

According to the bearing seat of a ball joint according to another aspect of the present invention, in addition to the effect of the bearing seat of a ball joint according to any of the above aspects of the present invention, the distance between the mutually adjacent housing concave portions can also be made approximately uniform by opening the housing concave portions respectively in approximately circular forms, therefore, lubricity can further be improved.

According to the ball joint according to a further aspect of the present invention, lubricity can be improved by comprising the bearing seat according to any one of the above aspects of the present invention.

DETAILED DESCRIPTION THE INVENTION

Hereinafter, a ball joint according to an embodiment of the present invention will be described with reference to FIG. 1 to FIG. 4.

Figure 4:
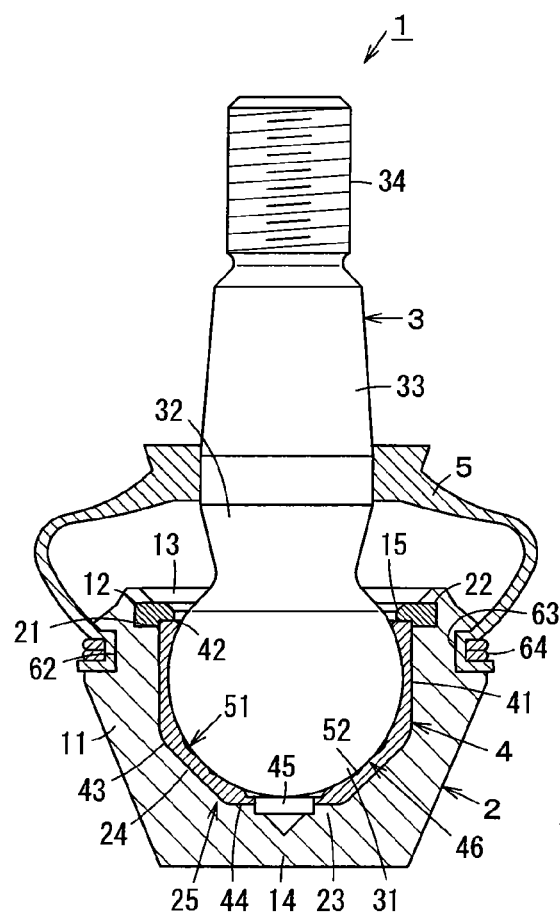
FIG. 4 A longitudinal sectional view showing the same ball joint as the above.

In FIG. 4, reference numeral 1 denotes a ball joint. This ball joint 1 is used in, for example, a suspension device, steering device or the like of an automobile, etc., and includes a socket 2 made of a metal or the like in an approximately cylindrical shape with a bottom, a ball stud 3 made of steel or the like, a ball seat 4 made of a synthetic resin or the like being a bearing seat, and a dust cover 5 formed of a rubber or a soft synthetic resin, etc., in an approximately cylindrical shape.

The socket 2 includes a socket body 11 and a plug 12. The socket body 11 is formed in a cylindrical shape with a bottom integrally provided with an insertion hole 13 opened at one end and a bottom portion 14 blocked at the other end. On the other hand, the plug 12 is formed in a cylindrical shape attached to the insertion hole 13 of the socket body 11 and opened with an opening portion 15.

Furthermore, on the insertion hole-side 13 of the inner circumferential surface of the socket body 11, a contact portion 21 formed with a large diameter so as to have an approximately equal dimension to the outer diameter of the plug 12 is formed in a step-like form. A caulking portion 22 of a thinner wall than the socket body 11 and provided coaxially in a cylindrical shape is provided at a rim portion of the insertion hole 13 of the socket body 11. This caulking portion 22 catches and fixes the plug 12 by being deformed inward by caulking.

And furthermore, a plane-like inner bottom surface portion 23 approximately parallel to the opening portion 15 of the plug 12 is provided at the bottom portion 14 of the socket body 11, and on this inner bottom surface portion 23, integrally provided is an inclined surface portion 24 inclined by an aperture expansion in a manner expanding the diameter toward the opening portion 15.

And, for the socket 2, formed inside is an inner chamber 25 continuous with the opening portion 15, and owing to the opening portion 15 and inner chamber 25, the socket 2 has an approximately cylindrical shape with a bottom. Moreover, on a position such as a side surface of the socket body 11 of the socket 2 or a lower surface of the bottom portion 14, an unillustrated connecting portion having a male screw, a female screw, an arm, or the like is provided.

Moreover, for the ball stud 3, an approximately globular ball portion 31 being a ball head portion, a small diameter portion 32 inserted through the opening portion 15 of the socket 2, and an approximately columnar stud portion 33 being a shaft portion have been integrally formed in a rod form. The ball portion 31 is formed larger in diameter than the stud portion 33. And, at a tip portion of the stud portion 33, a male screw portion 34 is provided.

Furthermore, the ball seat 4 is formed of a high load-bearing, rigid and resilient synthetic resin having satisfactory bearing characteristics, such as a polyacetal resin, a polyurethane resin, and a polyamide resin. And, the ball seat 4 is provided with a cylindrical body portion 41. At one end in the axial direction of this body portion 41, namely, in the longitudinal direction, an opening 42 communicated with the opening portion 15 is formed. Into this opening 42, the ball portion 31 of the ball stud 3 is inserted, and the stud portion 33 is passed. On the other hand, at the other end in the longitudinal direction of the body portion 41, an inclined plate portion 43 whose outer surface abuts against the inclined surface portion 24 of the socket 2 in an opposing manner is integrally provided. In addition, at a lower-end portion of this inclined plate portion 43, a bottom plate portion 44 whose outer surface abuts against the inner bottom surface portion 23 of the socket 2 in an opposing manner is integrally provided. In an approximately center area of this bottom plate portion 44, a through-hole 45 provided in a manner penetrating in the up-and-down direction and blocked at whose lower-end portion by the inner bottom surface portion 23 is provided.

As a result, the ball seat 4 has an approximately spherical sliding surface 46 corresponding to the ball portion 31 across the entire inner surface of the body portion 41, inclined plate portion 43, and bottom plate portion 44, namely, in a section from the through-hole 45 to the opening 42, and is molded in a cylindrical shape to hold the ball portion 31 so as to be slidable by this sliding surface 46. Namely, the sliding surface 46 has a longitudinal direction that is an up-and-down direction shown in FIG. 1 from the through-hole 45 being one-end side in the axial direction to the opening 42 being the other end side in the axial direction and a latitudinal direction that is a circumferential direction concentric with the through-hole 45 and opening 42.

Figure 1:
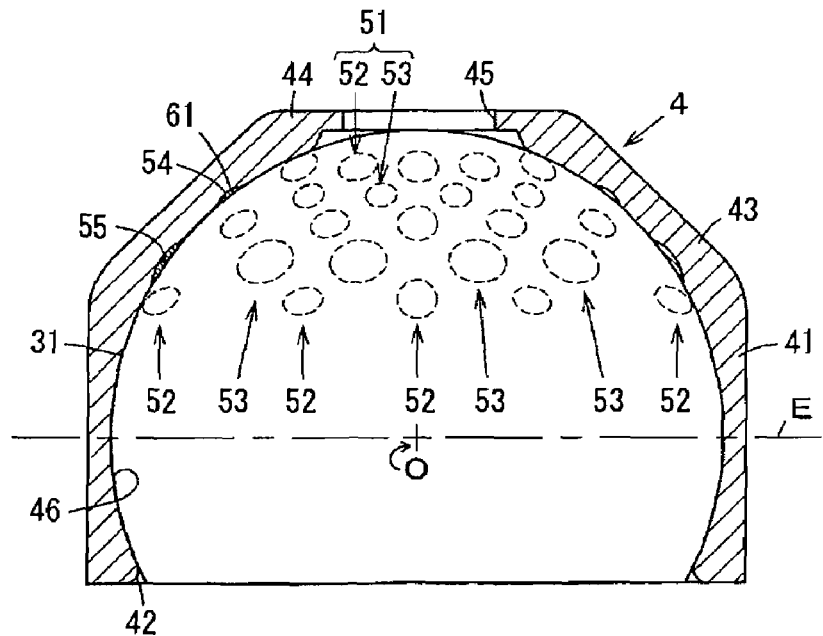
FIG. 1 A longitudinal sectional view showing a part of a ball joint according to an embodiment of the present invention.
Figure 2:
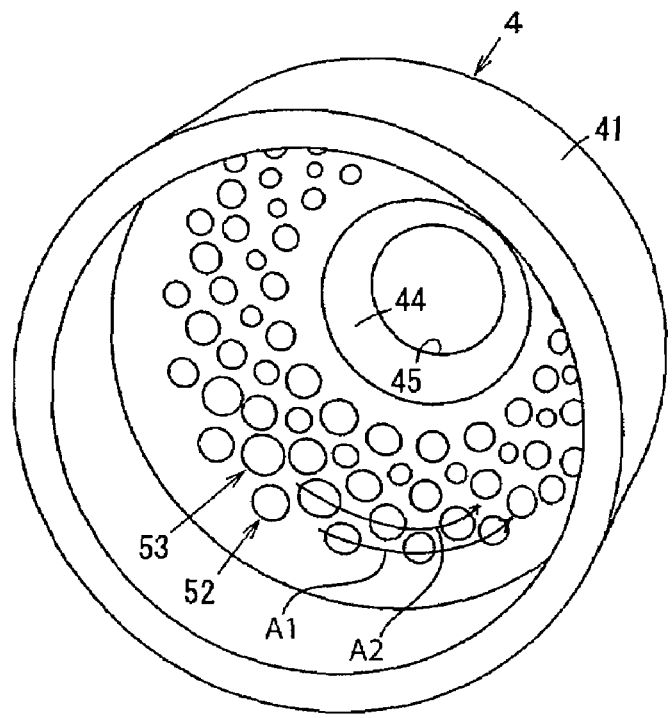
FIG. 2 A perspective view showing a bearing seat of the same ball joint as the above.
Figure 3:
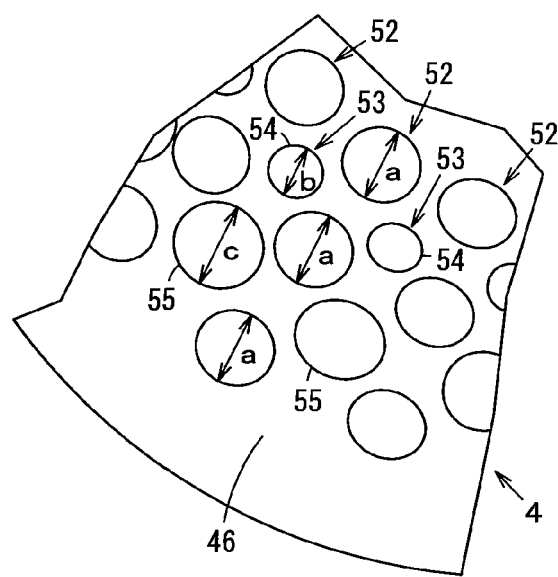
FIG. 3 A perspective view showing a part of the same bearing seat as the above in an enlarged manner.

Moreover, as shown in FIG. 1 to FIG. 3, a plurality of dimples 52, 53 being concavities are provided as housing concave portions on the sliding surface 46.

These dimples are opposed to the outer circumferential surface of the ball portion 31 and opened respectively in circular forms toward a center O of the ball portion 31, and are provided entirely in the latitudinal direction of the sliding surface 46 at the through-hole 45 side further than an equator E of the ball seat 4.

Here, the equator E of the ball seat 4 is a part that roughly coincides with an equatorial position of the ball portion 31 of the ball stud 3 in a condition where the ball portion 31 of the ball stud 3 has been held on the ball seat 4, and the equatorial position of the ball portion 31 means a position where the outer circumferential surface of the ball portion 31 has the largest diametrical dimension.

In addition, these dimples are composed of first dimples 52 being first housing portions and second dimples 53 being second housing portions.

The first dimples 52 form lines from the through-hole 45 side being one-end portion in the longitudinal direction of the ball seat 4 to the equator E side along the longitudinal direction of the ball seat 4 and are provided in a plurality of tiers, for example, in three tiers, along the circumferential direction, namely, the latitudinal direction A1 adjacent to each other. In addition, these first dimples 52 have opening areas equal to each other. Namely, the first dimples 52 have diametrical dimensions equal to each other. Furthermore, for these first dimples 52, the respective lines are arranged so as to have angles approximately equal to each other in the latitudinal direction of the ball seat 4. In other words, the first dimples 52 are arranged almost uniformly in the latitudinal direction of the ball seat 4. Moreover, the respective tiers of the first dimples 52 are concentrically arranged around a center axis of the ball seat 4.

The second dimples 53 are located between the respective first dimples 52 in the longitudinal direction and latitudinal direction A2 of the ball seat 4. Namely, the second dimples 53 are provided approximately midway between the lines of the first dimples 52, at latitudinal direction positions mutually different from the respective first dimples 52.

Moreover, these second dimples 53 include small dimples 54 and large dimples 55.

The small dimples 54 have smaller diametrical dimensions b than the diametrical dimensions a of the first dimples 52, for example. Namely, the small dimples 54 are formed with smaller opening areas than those of the first dimples 52.

The large dimples 55 have larger diametrical dimensions c than the diametrical dimensions a of the first dimples 52, for example. Namely, the large dimples 55 are formed with larger opening areas than those of the first dimples 52 and small dimples 54.

And, the small dimples 54 and large dimples 55 form lines along the longitudinal direction of the ball seat 4 between the first dimples 52, and are arranged alternately with respect to the first dimples 52. Furthermore, the large dimples 55 are located at the equator E side of the ball seat 4 further than the small dimples 54. Accordingly, the second dimples 53 are respectively arranged so that the opening areas sequentially increase from the through-hole 45 side to the equator E side.

Moreover, the small dimples 54 and large dimples 55 are respectively concentrically arranged around the center axis of the ball seat 4.

And, the dimples 51 are adjacent to each other at approximately equal intervals in the latitudinal direction and longitudinal direction of the ball seat 4, and are provided, on the sliding surface 46 at the through-hole 45 side further than the equator E of the ball seat 4, alternately, namely, in a staggered manner, concentrically around the center axis of the ball seat 4. In other words, for the dimple 51, one first dimple 52 and a small dimple 54 or a large dimple 55 adjacent to the first dimple 52 are located at mutually different latitudinal direction position and longitudinal direction position. Namely, the small dimples 54 and large dimples 55 respectively form tiers along the latitudinal direction at the through-hole 45 side and equator E side in the longitudinal direction of a middle tier of the first dimples 52, for example. Therefore, the first dimples 52, small dimples 54, and large dimples 55 are coincident with each other in the quantity arranged in the respective tiers.

Moreover, in the respective dimples 51, a grease 61 being a lubricant is housed. This grease 61 is filled into the ball in advance before inserting the ball portion 31 into the ball seat 4.

The dust cover 5 is also referred to as a dust seal or a boot, which is formed in an approximately cylindrical shape having an annular fitting portion 62 at one end. This fitting portion 62 is latched by an annular clip 64 into an annular dust cover groove portion 63 provided at the outer circumferential surface of the socket body 11 of the socket 2.

And, when the ball stud 3 has swayed with respect to the socket 2, the ball portion 31 sways with respect to the ball seat 4, and the grease 61 housed in the respective dimples 51 is drawn in between the outer circumferential surface of the ball portion 31 and sliding surface 46 by a so-called wedge film effect, thus lubrication by the grease 61 is realized between the dimples 51.

As mentioned above, in the above embodiment, the plurality of dimples 51 that are opened on the spherical sliding surface 46 that rotatably holds the ball portion 31 and house the grease 61 are provided at alternate positions.

In greater detail, the first dimple 52 and the small dimple 54 or the large dimple 55 adjacent to the first dimple 52 are located at mutually different latitudinal direction position and longitudinal direction position.

As a result, since this allows to effectively use a dead space between the dimples 51 so as to provide the dimples 51 in a balanced manner in proximity to each other, the grease 61 spreads out between the respective dimples 51 even when, for example, sway of the ball portion 31 is relatively small, which can prevent an oil film deficiency to the utmost extent so as to improve lubricity, and the ball portion 31 sliding in a condition where the grease 61 has been sufficiently spread out improves wear resistance of the ball seat 4, therefore, durability of the ball joint 1 can also be improved.

Moreover, in the present embodiment, the three tiers are formed along the latitudinal direction by the plurality of first dimples 52 having opening areas almost equal to each other, and the tier is formed at the through-hole 45 side of the middle tier of the first dimples 52 along the latitudinal direction by the small dimples 54 and the tier is formed at the equator E side of the middle tier of the first dimples 52 along the latitudinal direction by the large dimples 55 having larger opening areas than the small dimples 54, so that the second dimples 53 are provided.

Therefore, since it becomes possible to efficiently use the space on the spherical sliding surface 46 that increases in area from the through-hole 45 side to the equator side E so as to provide the dimples 51 in greater proximity therebetween, and the distance between the dimples 51 is unified to unify lubricity between the dimples 51, therefore, lubricity can further be improved.

Furthermore, opening the dimples 51 in approximately circular forms allows to make the distance between the mutually adjacent dimples 51 almost uniform so as to easily realize lubrication by the grease 61 between the dimples 51 in comparison with, for example, a case where the dimples are opened in rectangular forms or the like, therefore, lubricity can further be improved.

And, opening the dimples 51 in approximately spherical concave forms allows to almost unify the pressure per unit area applied to the respective dimples 51, therefore, strength of the ball seat 4 can be improved.

Moreover, by making the first dimples 52, small dimples 54 of the second dimples 53, and large dimples 55 in the respective tiers coincident with each other in quantity, directionality is eliminated from the dimples 51, whereby unevenness in wear can be reduced.

Next, another embodiment will be described with reference to FIG. 5. Here, components and operations the same as those in the previous embodiment are denoted by identical letters or numerals to omit description thereof.

Figure 5:
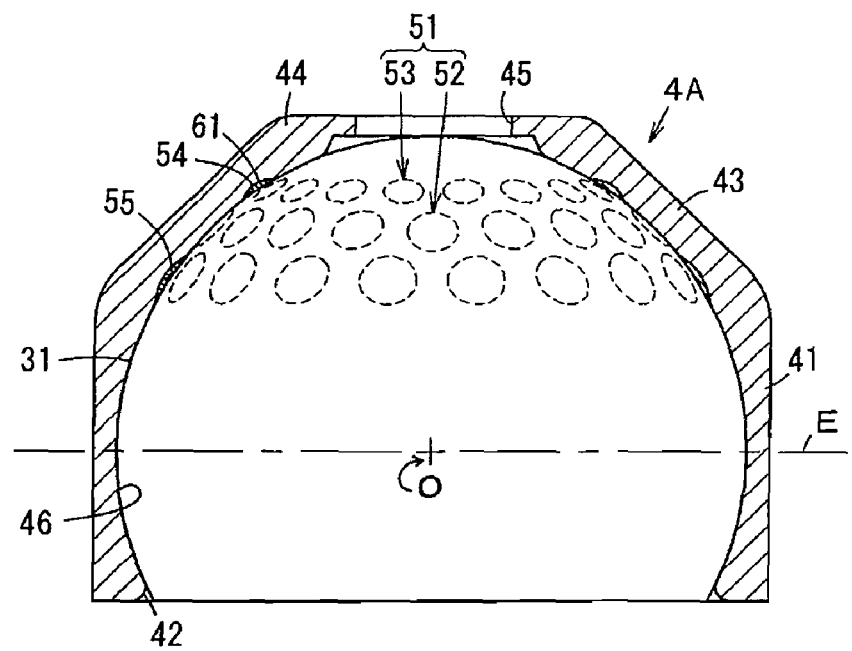
FIG. 5 A longitudinal sectional view showing a part of a ball joint according to another embodiment of the present invention.

The first dimples 52 are formed in one tier in the latitudinal direction of the ball seat 4 as shown in FIG. 5.

For the second dimples 53, the small dimples 54 and the large dimples 55 are respectively arranged along the latitudinal direction in tiers at the through-hole 45 side and equator E side in the longitudinal direction of the ball seat 4 of the first dimples 52. The dimples 54 and large dimples 55 are located in the latitudinal direction of the ball seat 4 alternately with the first dimples 52 and form lines in the longitudinal direction of the ball seat 4.

Namely, for the dimples 51, the first dimple 52 and the second dimples 53 are alternately arranged.

Accordingly, the dimples 51 are formed so that the opening areas sequentially increase from the tier at through-hole 45 side to the tier at the equator E side in the longitudinal direction of the ball seat 4.

And, by arranging the dimples 51 as such, operation effects the same as those in the above embodiment can be provided.

Here, in the above-described respective embodiments, arbitrary diametrical dimensions can be set for the small dimples 54 and large dimples 55 separately from the diametrical dimension a of the first dimples 52 as long as the large dimples 55 are larger than the small dimples 54.

Moreover, it is also possible to construct the dimples 51 by providing, in place of the second dimples 53, dimples having diametrical dimensions approximately equal to those of the first dimples 52 at positions alternating with the first dimples 52.

Furthermore, it is also possible to provide small-diameter dimples between the respective tiers of the respective dimples 52 and 53 as long as the dimples 51 can be provided in a balanced manner at alternate positions on the sliding surface 46, and the respective diametrical dimensions and the like of the dimples 51 are not limited to the above-described construction.

Figure 6:
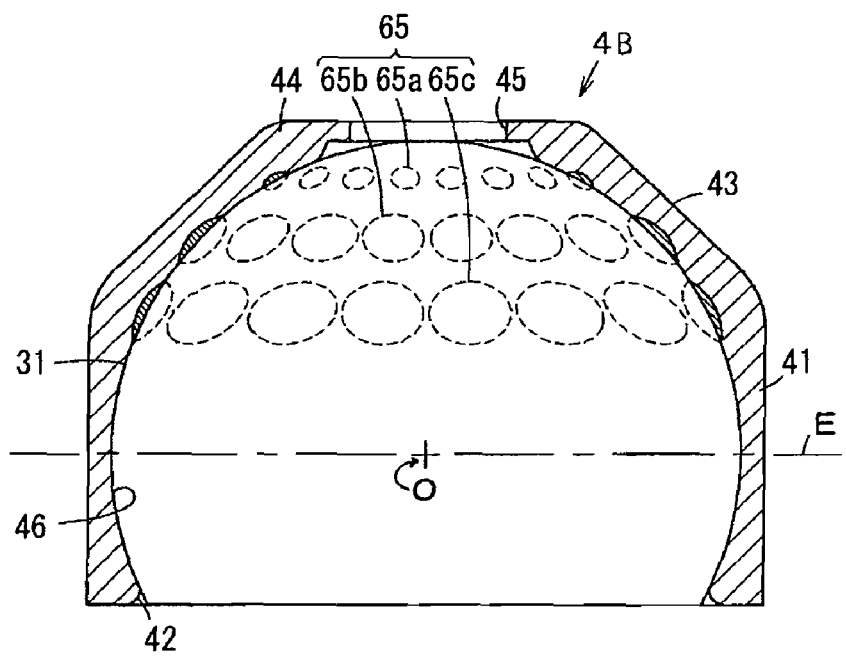
FIG. 6 A longitudinal sectional view showing a part of a ball joint according to a further embodiment of the present invention.

Next, a further embodiment will be described with reference to FIG. 6. Here, components and operations the same as those in the above embodiments are denoted by identical letters or numerals to omit description thereof.

A plurality of dimples 65 being concavities are provided as housing concave portions on the sliding surface 46. These dimples 65 are formed in three tiers including, for example, small dimples 65a, medium dimples 65b, and large dimples 65c.

These dimples 65a to 65c are, similar to the first dimples 52 and the second dimples 53, respectively, opposed to the outer circumferential surface of the ball portion 31 and opened respectively in circular forms toward the center O of the ball portion 31, and are provided entirely in the latitudinal direction of the sliding surface 46 at the through-hole 45 side further than the equator E of the ball seat 4. Moreover, these dimples 65a to 65c form lines adjacent in plural numbers, for example, in three tiers, from the through-hole 45 side to the equator E side along the longitudinal direction of the ball seat 4 and are provided in plural numbers adjacently in the latitudinal direction of the ball seat 4.

Furthermore, the respective dimples 65a to 65c are respectively arranged approximately uniformly in the latitudinal direction of the ball seat 4. Moreover, the respective tiers of the dimples 65 are arranged concentrically around a center axis of the ball seat 4. And, the respective dimples 65a to 65c respectively form lines along the longitudinal direction of the ball seat 4, and are sequentially arranged from the through-hole 45 side to the equator E side. Accordingly, the dimples 65 are arranged so that the opening areas sequentially increase.

Moreover, the dimples 65 are adjacent to each other at approximately equal intervals in the latitudinal direction and longitudinal direction of the ball seat 4, and are provided, on the sliding surface 46 at the through-hole 45 side further than the equator E of the ball seat 4, almost uniformly, concentrically around the center axis of the ball seat 4.

And, by arranging the dimples 65 as such, operation effects the same as those in the above embodiments can be provided.

Here, in the above-described respective embodiments, it is also possible to open the respective dimples 51 and 65 in forms other than the circular forms.

Moreover, the dimples 51 and 65 may be increased and reduced in the number of tiers along the latitudinal direction from that of the above-described respective embodiments. It is also possible to employ a construction such as, for example, to provide the dimples 51 and 65 on the entire sliding surface 46, namely, on the entire circumference of the sliding surface 46 from the through-hole 45 to the opening 42.

Furthermore, as the ball seat 4, it is also possible to use one in a cylindrical shape with a bottom for which no insertion hole 45 is provided.

Construction of the ball joint 1 is not limited to the above-described construction.

The present invention is utilized for, for example, a suspension device, steering device or the like of an automobile.

The invention claimed is:

1. A bearing seat provided in a socket with a socket opening, and a spherical sliding surface for rotatably holding an approximately globular ball portion of a ball stud arranged in the socket and wherein the bearing seat has a latitudinal direction, a longitudinal direction, and a bearing seat opening for approximately coinciding with the opening in the socket, comprising:
   a plurality of housing concave portions that are along first and second adjacent longitudinal direction positions on the sliding surface in a manner opposed to an outer circumferential surface of the ball portion for housing a lubricant; wherein
   the housing concave portions comprise:
      a plurality of first dimples respectively arranged apart from each other so as to form at least one tier along the latitudinal direction, opened in approximately circular forms, and having opening areas approximately equal to each other; and
      a plurality of second dimples including:
         a plurality of small diameter dimples respectively arranged apart from each other along the latitudinal direction at positions of a side opposite the socket opening with respect to the at least one tier of the first dimples forming a tier, opened in approximately circular forms, and having opening areas approximately equal to each other; and
         a plurality of large diameter dimples respectively arranged apart from each other along the latitudinal direction at positions of a side of the socket opening with respect to the small dimples, opened in approximately circular forms, and having opening areas larger than those of the first dimples and approximately equal to each other.

2. The bearing seat of a ball joint as set forth in claim 1, wherein
   of the first dimples and the second dimples, mutually adjacent ones are different in a latitudinal direction position and a longitudinal direction position from each other.

3. The bearing seat of a ball joint as set forth in claim 1, wherein the first dimples further form another tier arranged so as to form a line between the tiers of the first dimples along the longitudinal direction, and
   wherein the second dimples respectively having opening areas different from those of the first dimples and are arranged apart from each other so as to form lines along the longitudinal direction at positions adjacent in the latitudinal direction to the first dimples.

4. A ball joint comprising:
   a socket with an opening portion;
   a bearing seat provided in the socket; and
   a ball stud having:
      an approximately globular ball portion rotatably held in the bearing seat and housed in the socket; and
      a stud portion provided in a protruding condition from this ball portion and to be inserted through the opening portion,
   wherein the bearing seat includes:
      a spherical sliding surface rotatably holding the ball portion and has a latitudinal direction and a longitudinal direction;
      an opening approximately coinciding with the opening portion; and a plurality of housing concave portions that are opened on the sliding surface in a manner opposed to an outer circumferential surface of the ball portion and house a lubricant, wherein the plurality of housing concave portions includes:

a plurality of first dimples respectively arranged apart from each other so as to form at least one tier along the latitudinal direction, opened in approximately circular forms, and having opening areas approximately equal to each other; and a plurality of second dimples including:

a plurality of small diameter dimples respectively arranged apart from each other along the latitudinal direction at positions of a side opposite the opening with respect to the at least one tier of the first dimples, opened in approximately circular forms, and having opening areas approximately equal to each other; and a plurality of large diameter dimples respectively arranged apart from each other along the latitudinal direction at positions of a side of the opening with respect to the small dimples, opened in approximately circular forms, and having opening areas larger than those of the first dimples and approximately equal to each other.

\* \* \* \* \*